(12) United States Patent
Diab et al.

(10) Patent No.: US 8,026,635 B2
(45) Date of Patent: *Sep. 27, 2011

(54) POWER OVER ETHERNET POWER SOURCING EQUIPMENT ARCHITECTURE FOR VARIABLE MAXIMUM POWER DELIVERY

(75) Inventors: Wael William Diab, San Francisco, CA (US); Hemanth Nekkileru, San Jose, CA (US); Sesha Thalpasai Panguluri, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/753,948

(22) Filed: Apr. 5, 2010

(65) Prior Publication Data

US 2010/0187915 A1 Jul. 29, 2010

Related U.S. Application Data

(63) Continuation of application No. 12/025,821, filed on Feb. 5, 2008, now Pat. No. 7,696,640.

(51) Int. Cl.
*H02J 1/10* (2006.01)

(52) U.S. Cl. .......................................... 307/29

(58) Field of Classification Search ...................... 307/29
See application file for complete search history.

(56) References Cited

U.S. PATENT DOCUMENTS

| 4,791,349 | A | 12/1988 | Minks |
| 7,474,704 | B2 | 1/2009 | Lum et al. |
| 7,696,640 | B2 * | 4/2010 | Diab et al. ...................... 307/29 |
| 2008/0204160 | A1 | 8/2008 | Prodic et al. |

OTHER PUBLICATIONS

BCM59101 Product Brief, Broadcom Corporation, 2007.
BCM59103 Product Brief, Broadcom Corporation, 2007.

* cited by examiner

*Primary Examiner* — Robert L. Deberadinis
(74) *Attorney, Agent, or Firm* — Duane S. Kobayashi

(57) ABSTRACT

A power over Ethernet (PoE) power sourcing equipment (PSE) architecture for variable maximum power delivery. PoE PSE subsystems rely on some control to "turn on" a power field effect transistor (FET), which allows current to be transmitted to a powered device (PD). A hybrid approach is provided where an internal FET can be augmented with an external FET to provide an architecture that can be flexibly applied to applications with various space, cost and cooling limitations. The maximum delivered power can also be boosted with the addition of an external FET to the internal FET.

19 Claims, 3 Drawing Sheets

POWER OVER ETHERNET POWER SOURCING EQUIPMENT ARCHITECTURE FOR VARIABLE MAXIMUM POWER DELIVERY

This application is a continuation of non-provisional patent application Ser. No. 12/025,821, filed Feb. 5, 2008, now U.S. Pat. No. 7,696,640, which is incorporated by reference herein, in its entirety, for all purposes.

BACKGROUND

1. Field of the Invention

The present invention relates generally to power over Ethernet (PoE) and, more particularly, to a PoE power sourcing equipment architecture for variable maximum power delivery.

2. Introduction

In a PoE application such as that described in the IEEE 802.3af and 802.3at specifications, a power sourcing equipment (PSE) delivers power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.at, on the other hand, a PSE may be able to deliver up to 30 W of power to a single PD over two wire pairs. Other proprietary solutions can potentially deliver even higher levels of power to a PD.

In accommodating the ever-increasing range of potential power delivery levels it is important that the field effect transistor (FET) design of the PSE have sufficient flexibility. What is needed therefore is a PoE PSE architecture for variable maximum power delivery.

SUMMARY

A power over Ethernet power sourcing equipment architecture for variable maximum power delivery, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
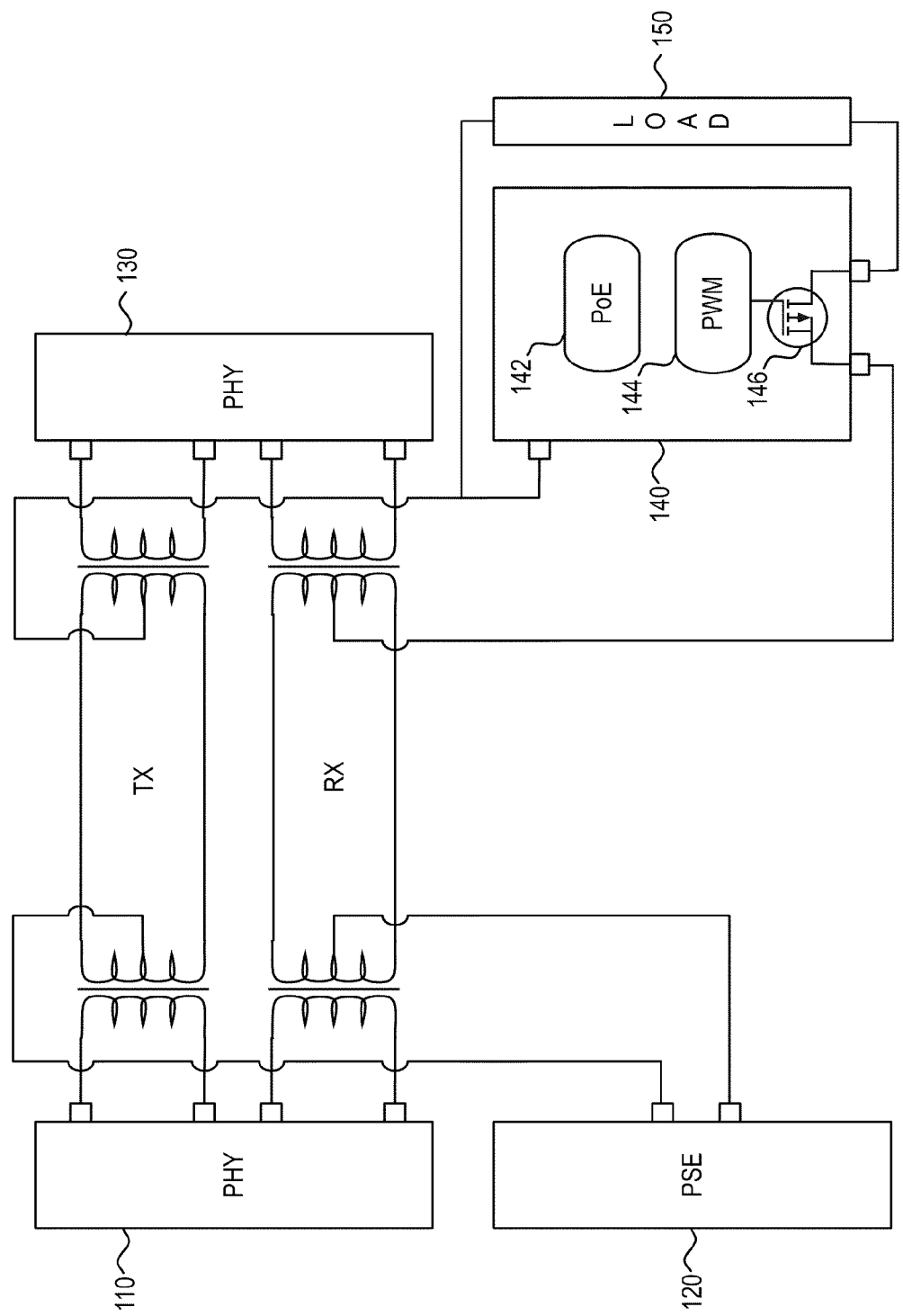
FIG. 1 illustrates an embodiment of a PoE system.

FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10 BASE-T, 100 BASE-TX, 1000 BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at draft specification, on the other hand, a PSE may be able to deliver up to 30 W of power to a PD over two wire pairs. Other proprietary solutions can potentially deliver even higher levels of power to a PD. Those or even higher levels of power can also be provided to a PD over four wire pairs.

In delivering power to a PD, a PSE fundamentally relies on some control to "turn on" a power FET (power switch), which allows current to be transmitted through it to the PD on the other side of the link. In one example, the power FET is an internal FET, which allows for a high level of integration and lower cost. In one embodiment, an integrated PSE controller would include the microcontroller, power switches, as well as current sense, detection, classification, and disconnect functionality.

In general, internal FETs are advantageous in the efficiencies (e.g., space, power, etc.) that are gained in producing an integrated architecture. These efficiencies are gained due to the optimizations that can be implemented in a higher-level system design. By necessity, these optimizations are targeted at a particular application. For example, a PSE controller can be optimized for a given power level (e.g., 30 W per port in an 802.3at application). A consequence of such optimizations is the loss of flexibility. For example, while an internal FET architecture can be optimized for 30 W per port, this power level can also represent a maximum power limit. Further power applications at higher power levels would therefore be precluded from its designed operation.

In contrast to these integrated architectures, the power FET can be designed as an external FET. External FETs allow for more flexibility in the maximum power delivery due to variability of the sizing of the external FET. Unfortunately, these designs suffer from higher cost, lower integration and limitations on the FET selection. Furthermore, external FETs often require odd-shaped heatsinks, which can be prohibitive in very high power applications with multiple ports. For these and other reasons, the external FET approach has limitations where space, cost and cooling can be an issue.

Figure 2:
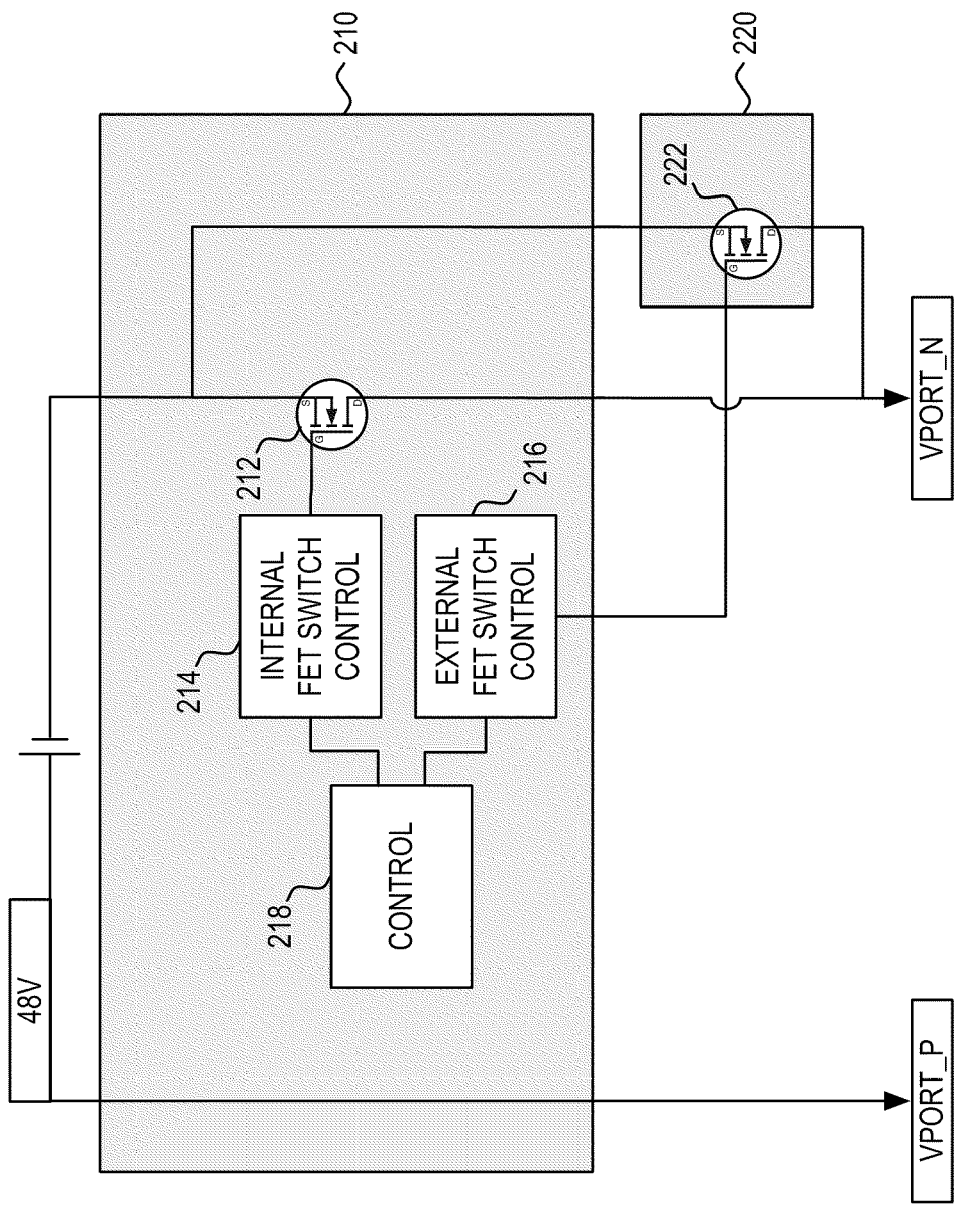
FIG. 2 illustrates an embodiment of a PoE power sourcing equipment architecture for variable maximum power delivery.

In the present invention, flexibility is retained in the power FET design process without sacrificing the benefits of optimizations provided with integrated architectures. To illustrate the principles of the present invention, reference is now made to the example embodiment of FIG. 2. As illustrated in FIG. 2, a hybrid power FET approach is used that is based on both an internal power FET 212 and an external power FET 222.

In one design process, internal power FET 212 can be optimized for a target application for which the PSE would commonly be used. For example, internal FET 212 can be sized to accommodate 30 W of power. Based on this FET sizing, the integrated architecture of chip 210 can be optimized for that target application. It is a feature of the present invention, that the optimization of the integrated architecture does not limit the flexibility of the overall design. Rather, flexibility is enabled through the augmentation of internal FET 212 with external FET 222. More specifically, the maximum power can be boosted with the addition of external FET 222 to internal FET 212.

In higher-power applications, the addition of external FET 222 in parallel to internal FET 212 in a hybrid design acts to reduce the overall resistance of internal FET 212, thereby allowing for higher power. Here, $R_{tot} = R_{int} \| R_{ext} = (R_{int} * R_{ext})/(R_{int} + R_{ext})$. This has several advantages over conventional designs. One advantage is that the size of the external FET required to achieve a higher power X is considerably smaller than a conventional design that only relies on an external FET. For example, in a 40 W application, an external FET would need to be sized to deliver the full 40 W. This 40 W sizing would present numerous difficulties in design. A hybrid approach, on the other hand, can meet the 40 W application through a combination of an internal FET and an external FET. For example, the internal FET can be designed for a target application of 30 W, while a smaller external FET can be included to provide the additional 10 W of required power. In another example, the internal FET can be designed for a target application of 10 W, while an external FET can be included to provide the additional 30 W of required power. As the external FET in the hybrid solution can be much smaller as compared to the external FET in an external-only solution, greater design flexibility is provided in achieving a higher maximum power. The hybrid approach therefore allows for lower costs as compared to conventional designs.

Another advantage of the hybrid design is that the current drive is also much smaller as the drive strength is related to the size of the FET. Yet another advantage is that the hybrid solution can also be configured as an internal-only solution (i.e., no external FET). In FIG. 2, external FET 222 is illustrated as being contained within area 220. In one embodiment, the design process can predefine a physical space requirement for area 220 to accommodate a range of external FET sizes. The predefined nature of area 220 would thereby enable designers to start the design process early yet retain the ability to customize the design at a later stage through the selection of an external FET that would suit a particular application. In other words, area 220 enables a design flexibility that can produce an ideal architecture for applications with space, cost and cooling limitations. Higher port densities are thereby enabled as compared to internal or external only designs In the illustrated embodiment of FIG. 2, internal FET 212 is controlled by internal FET switch control 214, while external FET 222 is controlled by external FET switch control 216. Internal FET switch control 212 and external FET switch control 214 are both coupled to control 218. Control 218 can be embodied as a hardware/software control logic. In operation, control 218 can be designed to effect the relative switching of internal FET 212 and external FET 214. In one embodiment, internal FET 212 would be used up until an internal current limit is reached. The decision to switch over to external FET 222 can be based on various factors, including a request for more current from the PD side, and thermal runaway due to internal power dissipation. In general, since the flexible internal architecture allows precise measurement of the current and the drop across internal FET 212, an intelligent decision can be made regarding the need to effect relative switching between internal FET 212 and external FET 222. In another embodiment, external FET 222 would be switched on first. In yet another embodiment, both internal FET 212 and external FET 222 can be switched on together and used in parallel. Here, the parallel use of internal FET 212 and external FET 222 from the onset would be useful not for more power, but to reduce Rds_on.

As noted, the flexible design process enables design decisions to determine the relative usage between internal and external FETs. In one example, a multi port PSE can be designed with a few high-power ports, with remaining ports being configured for low-power use. Here, all the ports can use the same chip with the integrated FET, while the few higher-power ports can be configured with an additional external FET.

Figure 3:
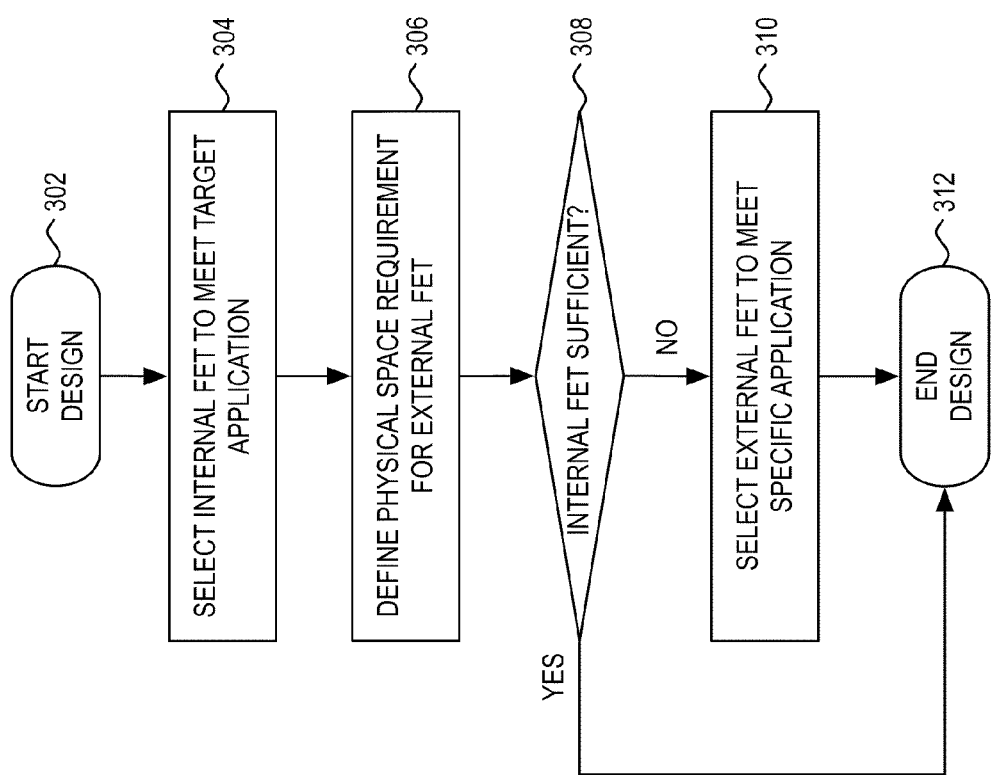
FIG. 3 illustrates an embodiment of a design process.

To further illustrate the features of the present invention, reference is now made to the flowchart of FIG. 3, which illustrates an embodiment of a design process. As illustrated, the design process begins at step 302. In a hybrid architecture design, the combination of internal and external FETs enable significant design flexibility because neither FET on its own is required to satisfy the full range of applications. For this reason, at step 304, the internal FET can be selected to meet a target application. Here, the target application can represent a common or otherwise predominant application for which the PSE would be used. For example, the internal FET can be selected to accommodate the most commonly used range of PoE power levels. As noted, the internal FET architecture allows for high integration and lower cost (e.g., system, subsystem and IC levels).

After the internal FET architecture is optimized for the target application, the physical space requirement for an external FET is then defined at step 306. At this stage of the design process, the specific external FET to be used need not be selected. Rather, the defined physical space requirement preserves the design flexibility to add an external FET to the hybrid architecture to meet the needs of a particular application. In one example, the particular application can represent the particular needs of a customer or manufacturer.

In addressing the needs of a particular application, a determination can be made at step 308 as to whether the internal FET architecture would be sufficient. For example, the determination at step 308 can examine whether the internal FET architecture can meet the maximum power level of the particular application. If the internal FET is determined to be sufficient, then the design process would end at step 312. In this scenario, the PSE can ship without an external FET in the predefined physical space. If, on the other hand, it is determined at step 308 that the internal FET is not sufficient on its own, then the process continues to step 310 where an external FET is selected to meet the needs of the particular application. Significantly, the external FET is not selected to meet the needs of the particular application on its own. Rather, the external FET is selected to meet the needs of the particular application in combination with the previously selected internal FET. As such, the external FET can be much smaller as compared to external-only FET designs. This fact enabled a relaxation in the definition of the physical space requirement. Once the external FET is selected, its inclusion in the predefined physical space would serve to complete the design at step 312.

As has been described, the hybrid FET approach of the present invention enables significant design flexibility as compared to internal-only or external-only FET designs. As would be appreciated, the hybrid approach can involve various levels of integration in the PoE PSE subsystem. The hybrid design can therefore be applied to various consumer or enterprise environments, as well as standalone, stackable and chassis implementations of PoE.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power sourcing equipment for powering a powered device in a power over Ethernet system, comprising:
   an integrated controller, said integrated controller including,
   a first power transistor for delivering power to the powered device;
   a first switch control logic that controls said first power transistor, said first power transistor providing a first level of power; and
   a second switch control logic that controls a second power transistor, which is external to said integrated controller, said second power transistor augmenting a capacity of the power sourcing equipment in powering the powered device through a delivery of a second level of power greater than said first level of power.

2. The power sourcing equipment of claim 1, wherein said integrated controller further includes a control logic that controls said first switch control logic and said second switch control logic.

3. The power sourcing equipment of claim 1, wherein said first power transistor is optimized for a common application.

4. The power sourcing equipment of claim 3, wherein said second power transistor is an optional transistor that can be designed to augment a power delivery of said first power transistor.

5. The power sourcing equipment of claim 1, wherein said first power transistor is in parallel with said second power transistor.

6. The power sourcing equipment of claim 1, wherein said integrated controller further includes powered device detection, powered device classification, and powered device disconnect components.

7. A power sourcing equipment in a power over Ethernet system, comprising:
   a first power transistor that is integrated with a first switch control into a single chip, said first switch control enabling an activation of said first power transistor to provide a first level of power; and
   a second power transistor, external to said single chip, said second power transistor being controlled by a second switch control in said single chip, wherein activation of said second power transistor in combination with an activation of said first power transistor provides a second level of power greater than said first level of power.

8. The power sourcing equipment of claim 7, wherein said first power transistor is in parallel with said second power transistor.

9. The power sourcing equipment of claim 7, wherein said first power transistor is optimized for a common application.

10. The power sourcing equipment of claim 7, wherein said second power transistor is smaller than said first power transistor.

11. A method for generating a hybrid power sourcing equipment, comprising:
    integrating an internal power transistor into a power sourcing equipment controller chip, said power sourcing equipment controller chip including a first switch control that controls said internal power transistor, said first switch control activating said internal power transistor to produce a first level of power; and
    adding an external power transistor to the hybrid power sourcing equipment, said external power transistor being physically separate from said power sourcing equipment controller chip and being controlled by a second switch control inside said power sourcing equipment controller chip, said external power transistor being activated by said second switch control, wherein activation of said external power transistor in combination with an activation of said internal power transistor provides a second level of power greater than said first level of power.

12. The method of claim 11, wherein said adding comprises placing said external power transistor in parallel with said internal power transistor.

13. The method of claim 11, wherein a size of said external power transistor is smaller than said internal power transistor.

14. The method of claim 11, wherein said power sourcing equipment controller chip further includes powered device detection, powered device classification, and powered device disconnect components.

15. A method for operating a hybrid power sourcing equipment to provide power to a powered device, the hybrid power sourcing equipment including an internal power transistor that is integrated into a power sourcing equipment controller chip, and an external power transistor that is external to the power sourcing equipment controller chip, comprising:
    determining whether a power level provided by an initial one of the internal power transistor and the external power transistor is sufficient to meet an initial power need of the powered device; and
    turning on the remaining one of the internal power transistor and the external power transistor that was not turned on to meet said initial power need based on a determination that said initial one of the internal power transistor and the external power transistor is not sufficient to meet said initial power need.

16. The method of claim 15, wherein the internal power transistor is turned on first.

17. The method of claim 15, wherein the external power transistor is turned on first.

18. The method of claim 15, wherein said determining comprises recognizing a need of a change in a delivery of power to the powered device based on a message from the powered device.

19. The method of claim 15, wherein said determining comprises recognizing a need of a change in a delivery of power to the powered device based on a measurement in the hybrid power sourcing equipment.

* * * * *